United States Patent [19]
Cooke

[11] Patent Number: 6,148,480
[45] Date of Patent: Nov. 21, 2000

[54] HINGE CONSTRUCTION WITH A SNAP-OPEN, SNAP-SHUT FEEL, FOR A FOLDING MOBILE PHONE HANDSET

[75] Inventor: Michael Paul Cooke, Hampshire, United Kingdom

[73] Assignee: NEC Corporation, Tokyo, Japan

[21] Appl. No.: 09/245,355

[22] Filed: Feb. 5, 1999

[30] Foreign Application Priority Data

Feb. 6, 1998 [GB] United Kingdom .................. 9802469

[51] Int. Cl.[7] ...................................................... E05F 1/08
[52] U.S. Cl. .............................. 16/303; 16/305; 16/326; 16/324; 16/308; 379/433
[58] Field of Search .......................... 16/303, 304, 305, 16/330, 340, 341, 326, 327, 328, 308, 324, 325; 379/428, 433

[56] References Cited

U.S. PATENT DOCUMENTS

| 5,185,790 | 2/1993 | Mischneko ................................ 16/334 |
| 5,436,954 | 7/1995 | Nishiyama et al. ..................... 379/433 |
| 5,586,363 | 12/1996 | Fanuzzi ..................................... 16/331 |
| 5,905,796 | 5/1999 | Jung ........................................ 379/433 |
| 5,937,062 | 8/1999 | Sun ......................................... 379/433 |

FOREIGN PATENT DOCUMENTS 0 713 313  5/1996  European Pat. Off. .

*Primary Examiner*—Chuck Y. Mah
*Attorney, Agent, or Firm*—Sughrue, Mion, Zinn, Macpeak & Seas, PLLC

[57] ABSTRACT

A hinge construction for a two part folding mobile phone body has a spindle provided at one end with a torsion spring for applying torque in a closing direction to the two parts of the phone body. A first cam member is mounted on the spindle for movement axially thereof and has a portion engaged with one part of the phone body to prevent reciprocal rotation therebetween. A second cam member is attached to the other part of the phone body. A helical compression spring surrounding the spindle urges the first cam member into engagement with the second cam member. Push-button is disposed at the opposite end of the spindle for applying axial thrust to the first cam member to release the first cam member from the second cam member and allow opening movement of the body parts out of the closed position. The first and second cam members are shaped so as (a) to maintain the body parts in a closed position when closed and (b) to provide a torque urging the body parts towards a fully open position when in a partially open position. The hinge construction described is compact and provides all the desiderata for a folding body mobile phone.

7 Claims, 4 Drawing Sheets

6,148,480

HINGE CONSTRUCTION WITH A SNAP-OPEN, SNAP-SHUT FEEL, FOR A FOLDING MOBILE PHONE HANDSET

BACKGROUND OF THE INVENTION

1. Field of the Invention

The present invention relates to a hinge construction for a folding mobile phone handset.

2. Description of the Related Art

It has hitherto been proposed to provide a mobile phone handset with a flip-down portion on which the microphone of the phone is provided. The flip-down portion is of relatively light construction as it contains only the microphone and wiring for connecting the microphone to the remainder of the circuitry in the main body of the phone and a very simple hinge mechanism is all that is required. See, for example, U.S. Pat. No. 5,185,790.

If, however, it is required to divide the phone body into two parts both of which contain significant parts of the phone, as shown, for example in EPO713313-A, the provision of a suitable hinge is more difficult. It is desirable that the hinge should be as small as possible, whilst providing a snap-open, snap-shut feel.

SUMMARY OF THE INVENTION

It is an object of the present invention to provide a compact hinge construction for a mobile phone, whilst providing a snap-open, snap-shut feel.

In accordance with the invention, a hinge construction has a spindle provided at one end with first spring means for applying torque in a closing direction to the two parts of the phone body. A first cam member is mounted on the spindle for movement axially thereof and has a portion engaged with one part of the phone body to prevent reciprocal rotation therebetween. A second cam member is attached to the other part of the phone body. Second spring means urges the first cam member into engagement with the second cam member. Push-button means is disposed at the opposite end of the spindle for applying axial thrust to the first cam member to release the first cam member from the second cam member and allow opening movement of the body parts out of the closed position. When the body parts are in the a closed position, the body parts are maintained in such closed position. In a partially open position of the body parts, the first cam member engages with the second cam member and a torque urging the body parts towards a fully open position is applied to the body parts. At a result, it becomes possible to provide a compact hinge construction, whilst providing a snap-open, snap-shut feel.

The first spring means is preferably a torsion spring surrounding the spindle. The second spring means is preferably a helical compression spring surrounding the spindle.

The above and other objects, features and advantages of the present invention will become apparent from the following description with reference to the accompanying drawings which illustrate examples of the present invention.

DETAILED DESCRIPTION OF THE PREFERRED EMBODIMENT

Figure 1:
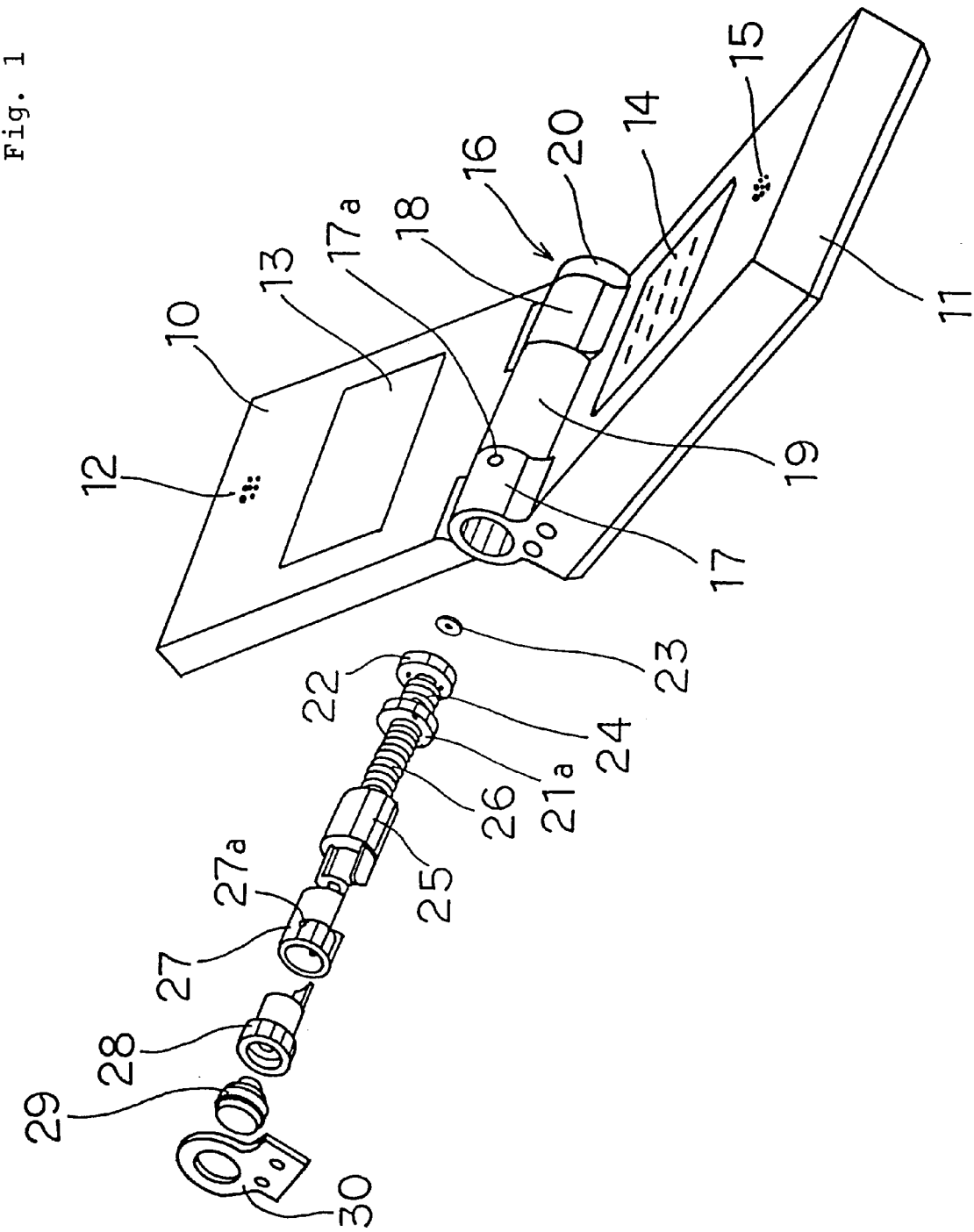
FIG. 1 is an exploded perspective view of a mobile phone handset having a hinge construction according to an embodiment of the present invention.

As shown in FIG. 1, a folding mobile phone handset provided with a hinge 16 as a hinge construction according to an embodiment of the present invention has a body comprising two parts 10 and 11 hingedly connected together. One body part 10 includes an ear speaker 12 and a display 13. The other body part 11 includes a key pad 14 and a microphone 15. Body parts 10 and 11 are of approximately the same dimensions, so that the length of the phone body is roughly halved by folding it into a closed position, the overall depth of the phone body being roughly doubled by this action.

Figure 2:
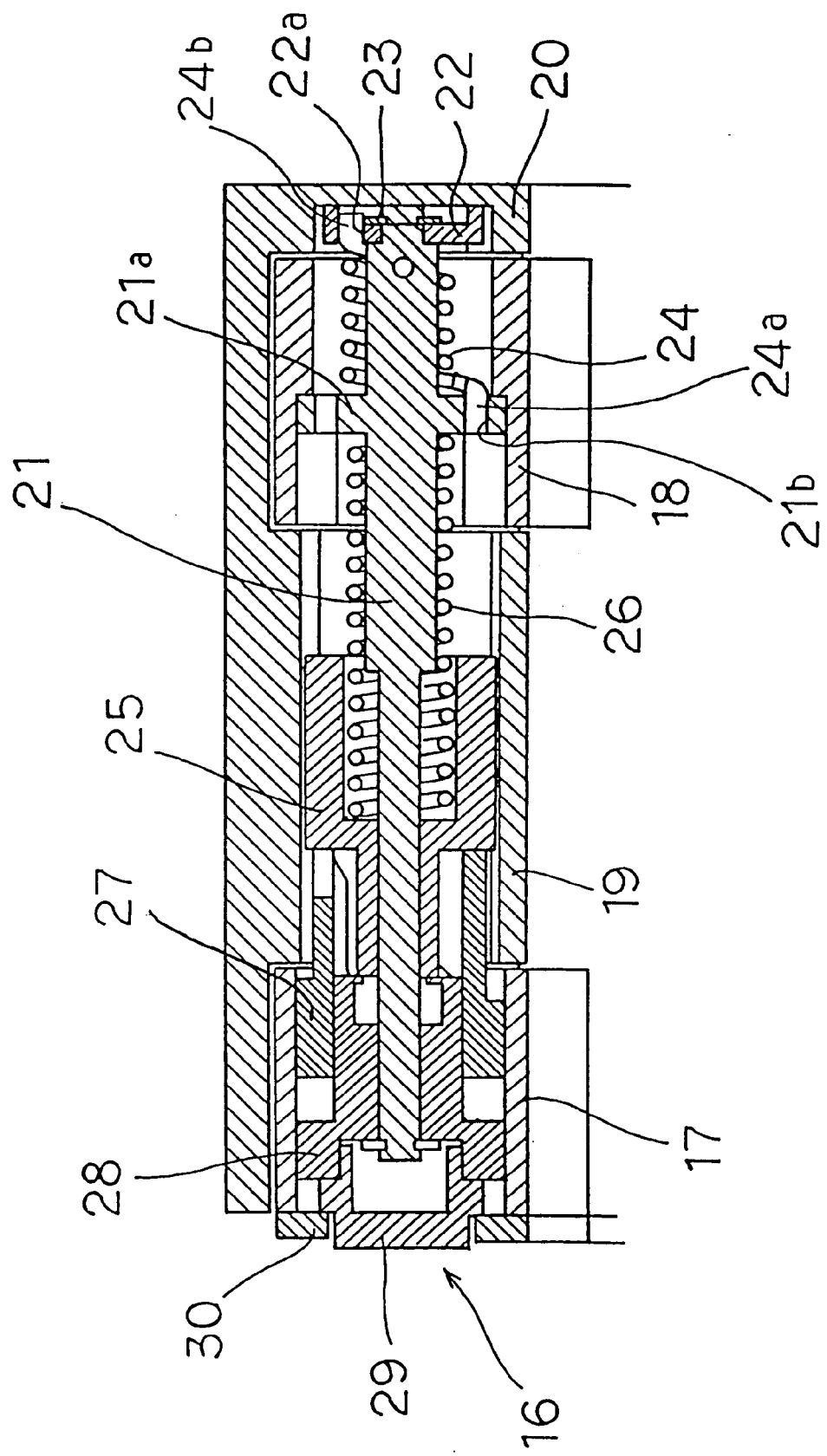
FIG. 2 is a section through the hinge construction shown in FIG. 1.

Body parts 10 and 11 of the phone body are connected by hinge 16 which includes portions 17, 18 integrally formed or secured to body part 11 and portions 19, 20 integrally formed or secured to body part 10. As shown in FIG. 2, the portions 17, 18, 19 and 20 of hinge 16 are aligned with one another and define a passageway extending from one axial end of hinge 16 to the other. Mounted in this passageway is a spindle 21. This spindle 21 has adjacent one end a flange 21a which has a non-circular periphery which fits inside a correspondingly shaped internal surface of portion 18. At the extreme end of spindle 21 is a non-circular washer 22, which is retained on spindle 21 by a clip 23 but which is free to rotate relative to spindle 21. Washer 22 is received by a correspondingly shaped socket in portion 20 to prevent rotation of washer 22 relative to portion 20. A coiled torsion spring 24, as a first spring means, on spindle 21 has tags 24a and 24b at opposite ends engaged respectively with flange 21a and washer 22, so that, in use, it provides a torque urging body parts 10 and 11 towards a closed position. Tag 24a engaged in a hole 21b in flange 21a, tag 24b engaged in a hole 22b in washer 22.

Figure 3:
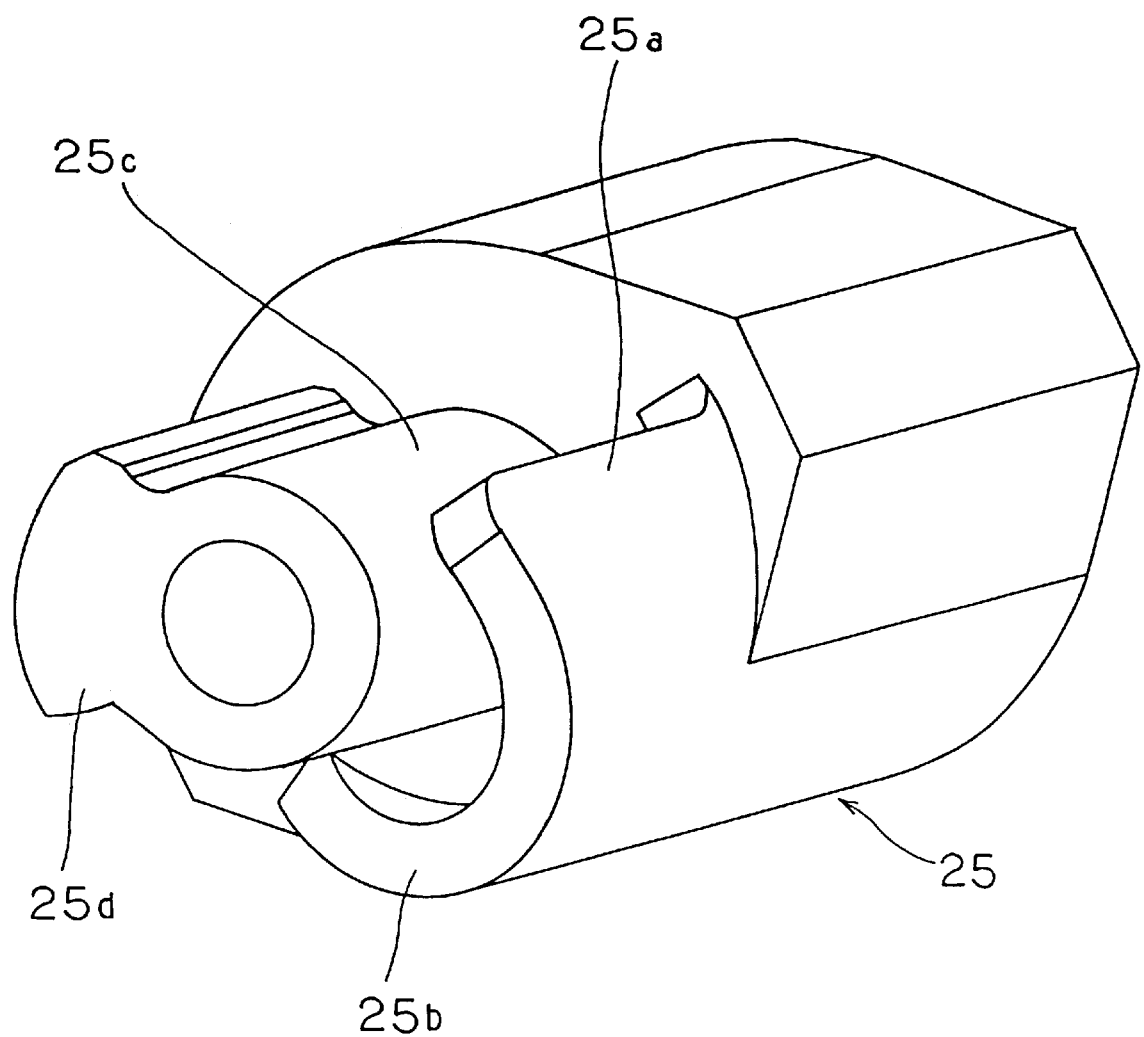
FIG. 3 is a perspective view of a first cam member of the hinge shown in FIGS. 1 and 2.
Figure 4:
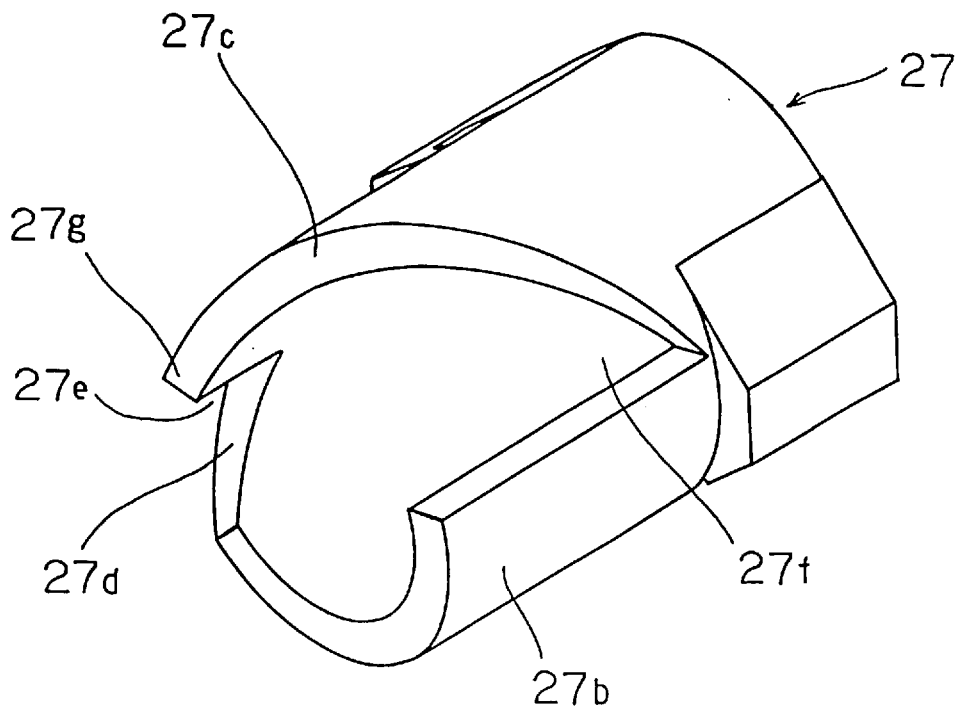
FIG. 4 is a perspective view of a second cam member of the hinge shown in FIGS. 1 and 2.

Slidably mounted inside portion 19 is a first cam member 25, which has an axial bore through which spindle 21 extends. First cam member 25 is free to move axially and rotationally on spindle 21, but has a non-circular periphery fitting within a correspondingly shaped non-circular internal surface of portion 19, so that first cam member 25 cannot turn relative to portion 19. As shown in FIG. 3, first cam member 25 has a part cylindrical shell portion 25a, projecting axially from one end, and this shell portion 25a has a helical end face 25b. First cam member 25 has an axial boss portion 25c which projects axially as far as shell portion 25a. Boss portion 25c has a lobe portion 25d extending therefrom in a direction away from shell portion 25a. First cam member 25 is arranged so that shell portion 25a and boss portion 25c thereof project axially away from the end of spindle 21 on which washer 22 is mounted. A helical compression spring 26 as a second spring means is provided on spindle 21 between flange 21a and first cam member 25 so that first cam member 25 is urged axially along spindle 21 away from flange 21a.

First cam member 25 co-acts with a second cam member 27 which has a non-circular periphery which is received by a corresponding non-circular internal surface of portion 17, so that second cam member 27 cannot rotate relative to portion 17. Second cam member 27 is also secured against axial movement relative to portion 17 by means of grub screws, not shown, which are fitted in holes 27a in portion 17 and aligned holes 27a in second cam member 27. Second cam member 27 has a part cylindrical shell portion 27b, which projects axially towards first cam member 25 and co-acts with shell portion 25a thereof. Shell portion 27b has a helical face 27c formed as the edge of a notch 27e in shell portion 27b and a helical face 27d formed as the edge of a notch 27f in shell portion 27b. These helical faces 27c and 27d have the same inclination as helical end face 25b. Notch 27e is smaller than notch 27f.

When body parts 10 and 11 of the phone body are in the closed position previously referred to, the tip of shell portion 25a engages in the smaller of two notches 27e and 27f in shell portion 27b. In a fully open position in which the angle included between the adjacent faces of body parts 10 and 11 is about 160°, the tip of shell portion 25a engages in the larger of two notches 27e and 27f. In both cases the shell's engagement in the notch holds body parts 10 and 11 of the phone body in the associated relative position as a result of the force applied by compression spring 26.

When reciprocal closing movement is applied by a user to body parts 10 and 11, face 27c applies a force to face 25b which urges first cam member 25 against the force of compression spring 26 and first cam member 25 moves to the right as viewed in FIG. 2 as body parts 10 and 11 are closed. As body parts 10 and 11 reach the closed position, there will be a brief interval where the tip of shell portion 25a is on the top 27g of shell portion 27b between two notches 27e and 27f. During this interval, compression spring 26 does not cause any opening torque to be applied to two parts 10 and 11 and, instead, coiled torsion spring 24 prevails in urging the parts towards their closed position. The tip of shell portion 25a then enters the smaller of two notches 27e and 27f in shell portion 27b.

Figure 5:
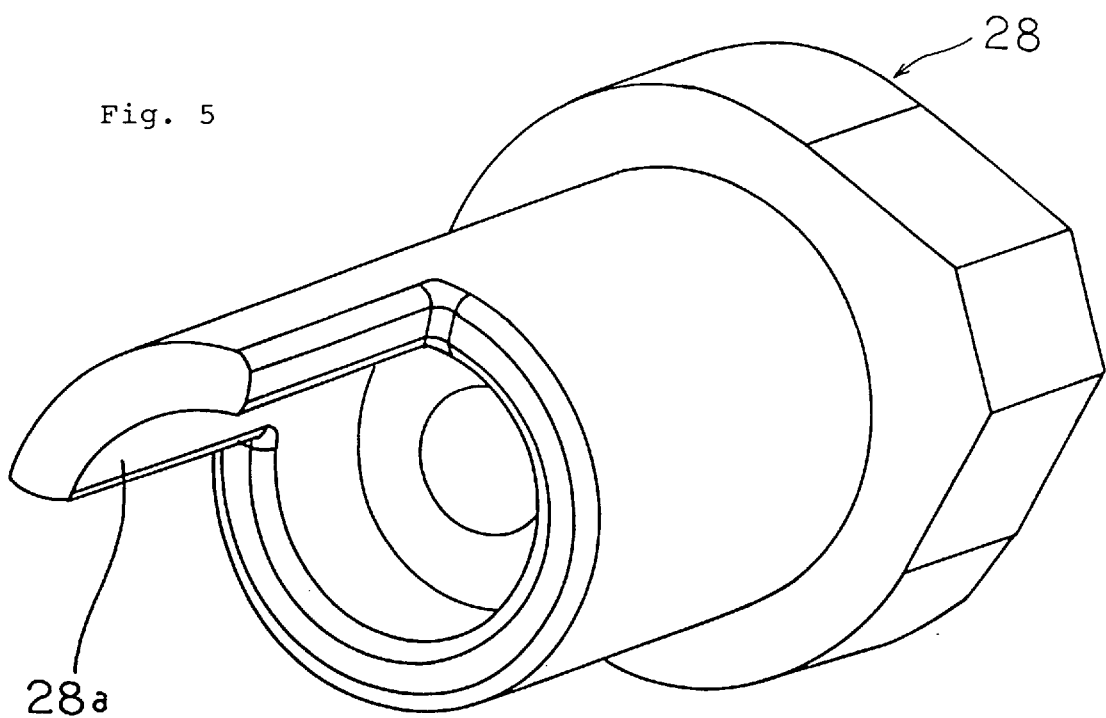
FIG. 5 is a perspective view of a pushbutton of the hinge shown in FIGS. 1 and 2.

For releasing body parts 10 and 11 from the closed position a release push button 28 is provided. This push button 28 has a non-circular periphery which fits in a correspondingly non-circular internal surface of portion 17 so that push button 28 cannot be turned relative to portion 17. As shown in FIG. 5, push button 28 has an elongated finger 28a which extends parallel to the axis of hinge 16 and is aligned with lobe 25d of first cam member 25 when body parts 10 and 11 are in the closed position. Push button 28 is axially slidable along spindle 21 and is fitted with a button cap 29 which projects through a retaining bracket 30 fitted on the end of portion 17.

Pressing in push button 28 when body parts 10 and 11 are in the closed position causes finger 28a to contact lobe 25d so that first cam member 25 is displaced axially to the right as viewed in FIG. 2, thereby lifting the tip of shell portion 25a from smaller notch 27e in shell portion 27b. The user can then start opening body parts 10 and 11 against the torque applied by torsion spring 24. If the user releases push button 28 after initial opening movement, the tip of shell portion 25a of first cam member 25 enters larger notch 27f in shell portion 27b and applies an opening torque to body parts 10 and 11 which exceeds the closing torque applied by coiled torsion spring 24.

The hinge arrangement described is compact and provides all the desiderata for a folding body mobile phone.

The hinge construction shown is such that all the parts of the hinge assembly can be pre-assembled and inserted into the passageway formed by portions 17, 18, 19 and 20.

While a preferred embodiment of the present invention has been described using specific terms, such description is for illustrative purposes only, and it is to be understood that changes and variations may be made without departing from the spirit or scope of the following claims.

What is claimed is:

1. A hinge construction for a two part folding mobile phone body, comprising:

a spindle provided at one end with first spring means for applying torque in a closing direction to the two parts of the phone body;

a first cam member mounted on said spindle for movement axially thereof and having a portion engaged with one part of the phone body to prevent reciprocal rotation therebetween;

a second cam member attached to the other part of the phone body;

second spring means for urging said first cam member into engagement with said second cam member; and push-button means disposed at the opposite end of said spindle for applying axial thrust to said first cam member to release said first cam member from said second cam member and allow opening movement of the body parts out of the closed position;

said first and second cam members being shaped so as (a) to maintain the body parts in a closed position when closed and (b) to provide a torque urging the body parts towards a fully open position when in a partially open position of the body parts.

2. A hinge construction according to claim 1, wherein said first spring means is in the form of a torsion spring.

3. A hinge construction according to claim 2, wherein said torsion spring has tags at opposite ends engaged respectively with a flange on said spindle and a washer rotatably mounted on said spindle, said washer being restrained against rotation relative to one part of the phone body and said spindle being restrained against rotation relative to the other part of the phone body.

4. A hinge construction according to claim 1, wherein said second spring means is in the form of a helical compression spring surrounding said spindle.

5. A hinge construction according to claim 1, wherein said first and second cam member each includes a part-cylindrical shell portion which has helical edges which engage one another when the body parts are in a partially opened position.

6. A hinge construction according to claim 5, wherein said shell portion of said second cam member is formed with a notch to receive a tip on said shell portion of said first cam member when the body parts are in the closed position.

7. A hinge construction according to claim 1, wherein said push-button means has an axially extending finger projecting towards said first cam member and said first cam member has a lobe portion projecting towards said push-button means, said finger and said lobe portion being aligned when the two parts of the phone body are in a closed position.

* * * * *

UNITED STATES PATENT AND TRADEMARK OFFICE
CERTIFICATE OF CORRECTION

PATENT NO. : 6,148,480
DATED : Nov. 21, 2000
INVENTOR(S) : Michael Paul Cooke

It is certified that error appears in the above-identified patent and that said Letters Patent is hereby corrected as shown below:

On title page, item [30]

Foreign Application Priority Data - insert ".8" after --9802469--.

Column 1, line 18, delete "U.S." insert --U.S. -A- --.

Column 2, line 40, delete "22b" insert --22a--.

Signed and Sealed this

Twenty-ninth Day of May, 2001

Attest:

NICHOLAS P. GODICI

*Attesting Officer*    *Acting Director of the United States Patent and Trademark Office*